United States Patent
Griese

(10) Patent No.: US 8,108,120 B2
(45) Date of Patent: Jan. 31, 2012

(54) BI-FUEL CONVERSION DEVICE FOR AN INTERNAL COMBUSTION ENGINE

(76) Inventor: Frederico Griese, Campinas (BR)

(*) Notice: Subject to any disclaimer, the term of this patent is extended or adjusted under 35 U.S.C. 154(b) by 0 days.

(21) Appl. No.: 12/783,328

(22) Filed: May 19, 2010

(65) Prior Publication Data
US 2010/0332104 A1 Dec. 30, 2010

Related U.S. Application Data

(63) Continuation-in-part of application No. 10/973,184, filed on Oct. 25, 2004, now abandoned.

(51) Int. Cl.
*F02D 28/00* (2006.01)
(52) U.S. Cl. ......................... 701/102; 701/104
(58) Field of Classification Search .................. 123/1 A, 123/27 GE, 458, 472, 476, 480, 486, 488, 123/491, 525, 526, 575, 576; 701/104, 105, 701/113, 115, 102, 103
See application file for complete search history.

(56) References Cited

U.S. PATENT DOCUMENTS

| | | | | |
|---|---|---|---|---|
| 4,127,086 A * | 11/1978 | Harada et al. | ................ | 123/493 |
| 4,869,224 A * | 9/1989 | Ishikawa et al. | .............. | 123/682 |
| 5,137,001 A * | 8/1992 | Taniguchi | ..................... | 123/494 |
| 5,190,001 A * | 3/1993 | Dieter et al. | ............. | 123/179.15 |
| 2003/0034008 A1* | 2/2003 | Katoh et al. | ............... | 123/406.5 |
| 2003/0034012 A1* | 2/2003 | Sato et al. | ..................... | 123/491 |
| 2003/0034013 A1* | 2/2003 | Sato et al. | ..................... | 123/491 |
| 2003/0037771 A1* | 2/2003 | Yuya et al. | ..................... | 123/491 |
| 2004/0122582 A1* | 6/2004 | Katoh et al. | ................. | 701/104 |

* cited by examiner

*Primary Examiner* — John Kwon
*Assistant Examiner* — Johnny Hoang
(74) *Attorney, Agent, or Firm* — Schmid PA

(57) ABSTRACT

Disclosed is a system including a fuel conversion device for use with a conventional internal combustion engine having an engine control unit and electronic fuel injectors allowing a conventional vehicle to operate using more than one type of fuel. The system intercepts the ECU's command signals being transmitted to the injectors before they reach the injectors and modifies the signals for optimizing the combustion cycle depending upon the type of fuel used. The conversion device enables a conventional gasoline engine to run on an alternative fuel such as alcohol, gasoline, or any combination of the two.

9 Claims, 6 Drawing Sheets

BI-FUEL CONVERSION DEVICE FOR AN INTERNAL COMBUSTION ENGINE

RELATED APPLICATION

This application is a continuation-in-part of U.S. patent application Ser. No. 10/973,184, filed Oct. 25, 2004, now abandoned the contents of which is hereby incorporated in its entirety.

TECHNICAL FIELD

The present invention relates to a device for extending the capability of a pre-existing conventional non-alcohol intended internal combustion engine to operate with alcohol as fuel, gasoline, or any mixture of the two. In greater detail, the present invention includes a device intercepting command signals sent by the engine control unit (ECU) and adjusts the signals to accommodate alcohol containing fuels.

BACKGROUND

Various industries such as the automotive industry have been under increasing demand to produce engines that can operate on different fuels such as gasoline and alcohol. However, internal combustion engines must have selectively adjustable parameters for efficient combustion when operating using different fuels.

The majority of engines today are conventional in that they are designed specifically to operate with gasoline and are unable to accommodate alternative fuels such as alcohol. These conventional engines are restricted by the limitations in their control units which are programmed for gasoline parameters only. These parameters are used by the ECU to control the engine based on input from various sensors found throughout the vehicle.

Typical sensors used in a conventional gasoline engine include a throttle position, mass airflow, fuel pressure, engine temperature, oxygen, and others. Although there are differences between sensors used in various engines, the standard ECU uses them to continuously calculate optimum fuel flow rates to optimize combustion. The ECU does this by referencing predetermined fuel flow rates located in look up tables in its memory, which are cataloged by specific combinations of sensor data.

As sensor data changes in real time, the ECU calculates variations to predetermined fuel flow rates, and provides them to the fuel injector(s) in a continuous stream of timing command signals, i.e. changes to injector fuel pulse width. The larger the fuel pulse width, the longer the injector(s) is open, yielding greater fuel flow, and vice versa. These variations to injector command signals cause changes in the combustion occurring in the cylinders, which in turn leads to new sensor data received by the ECU, and the process repeats. This repeating process forms a closed loop operation in which the ECU establishes and sustains optimized combustion.

As a safety measure to guard against malfunction, fuel flow variations commanded by standard ECUs are limited to a maximum variation from their fuel flow look up tables. For systems intended for gasoline-only, this limitation is typically in the order of a 10% to 20% maximum variation, depending on the year, make and model of each particular system. Although the ECU is otherwise capable of arriving at optimal fuel flow rates above this limitation, the limitation stands as the restrictive maximum and is sufficient for fuels comprised mostly of gasoline.

In cases where fuels of lower energy density than gasoline are used, such as alcohol or alcohol/gasoline blends with significant alcohol concentration, fuel flow variations greater than the limitation are required. In such cases, the ECU will typically illuminate the check engine light and the engine will run rough or fail to run.

This creates the need for additional variations to the fuel injector command signals to enable successful operation with alcohol containing fuels. Therefore what is needed is an apparatus and method for modifying a conventional vehicle to run on alcohol containing fuels along with the ability to run using traditional gasoline formulations.

SUMMARY

The present method and apparatus comprises a fuel conversion device for use with a conventional internal combustion engine having an engine control unit and electronic fuel injectors allowing a conventional engine to operate using more than one type of fuel. The system operates by intercepting fuel injector command signals sent by the ECU and adjusting them appropriately to optimize combustion thereby enabling successful operation with gasoline, alcohol, or any combination of the fuels.

In greater detail, the conversion device includes a computing device operatively connected to the engine control unit to receive signals from the unit. The computing device is operatively connected to the electronic fuel injectors for transmitting a signal to the injector(s) and controlling injection. The system further includes a temperature sensor in communication with the computing device.

The computing device acquires a signal from the engine control unit comprising a current fuel pulse width signal. The device then adds the current fuel pulse width to a correction factor with the resulting sum being a modified fuel pulse width. In an embodiment the correction factor may be a constant. The modified fuel pulse width signal is then sent to the electronic fuel injector(s) by the computing device.

A further embodiment includes the computing device additionally comparing the current fuel pulse with a previous fuel pulse and if they are not equal the device then determines a new correction factor. The correction factor is determined by adding a previous correction factor to the difference between the current fuel pulse and the previous fuel pulse to arrive at the new correction factor if the current fuel pulse is not equal to the previous fuel pulse. The previous correction factor is simply the last recorded factor. The initial correction factor may be 0 in an embodiment.

In an alternative embodiment, the fuel conversion device includes the correction factor being multiplied by the current fuel pulse width with the resulting product added to the current fuel pulse width if the correction factor is greater than 0 and less than 1. Additionally, the computing device may further compare the current fuel pulse with a previous fuel pulse with a new correction factor determined if the current fuel pulse is not equal to the previous fuel pulse. The new correction factor is calculated by adding a previous correction factor to the percent difference between the current fuel pulse and the previous fuel pulse.

The present fuel conversion device may determine a correction factor by using a tuning constant. The tuning constant comprises a fraction between 0 and 1 and may be either multiplied by the difference between the current fuel pulse width and the percent difference between the current fuel pulse and the previous fuel pulse or multiplied by the difference between the current fuel pulse and the previous fuel pulse.

Additionally, the fuel conversion device includes the device determining if a fuel source predominately comprises alcohol prior to adding the fuel pulse width. The fuel source type may be indicated by a switch operatively engaged to indicate the fuel source and recognized by the computing device. Furthermore, the fuel source type may be determined by interpreting the fuel injector command signals from the engine control unit by a previously stored determined conversion factor stored within the computing device as an internal logic flag to indicate alcohol in the fuel when a determined conversion factor exceeds a threshold number. The determined conversion factor may be the last recorded factor prior to shutdown upon the startup of the engine.

The computing device can acquire a temperature signal from the temperature sensor to determine if a cold start routine is needed. The cold start routine includes determining a cold start temperature upon the detection of the alcohol fuel and increasing the fuel pulse width and maintaining the increased cold start width when the cold temperature range is detected. Additionally, the computing device can reduce the fuel pulse width upon the detection of a normal operational temperature range. Normal or non-cold start routine operation may also be terminated upon a set period of time.

In a further embodiment, the present invention includes a method of operating a conventional internal combustion engine having an engine control unit and electronic fuel injectors to run on an alternative fuel based in at least part alcohol comprising various steps. The steps include acquiring a signal from the engine control unit comprising a current fuel pulse width signal and adding the current fuel pulse width to a correction factor with a resulting sum being a modified fuel pulse width. Additionally, the multiplied fuel pulse width signal is transmitted to the electronic fuel injector.

DRAWINGS

Figure 3:
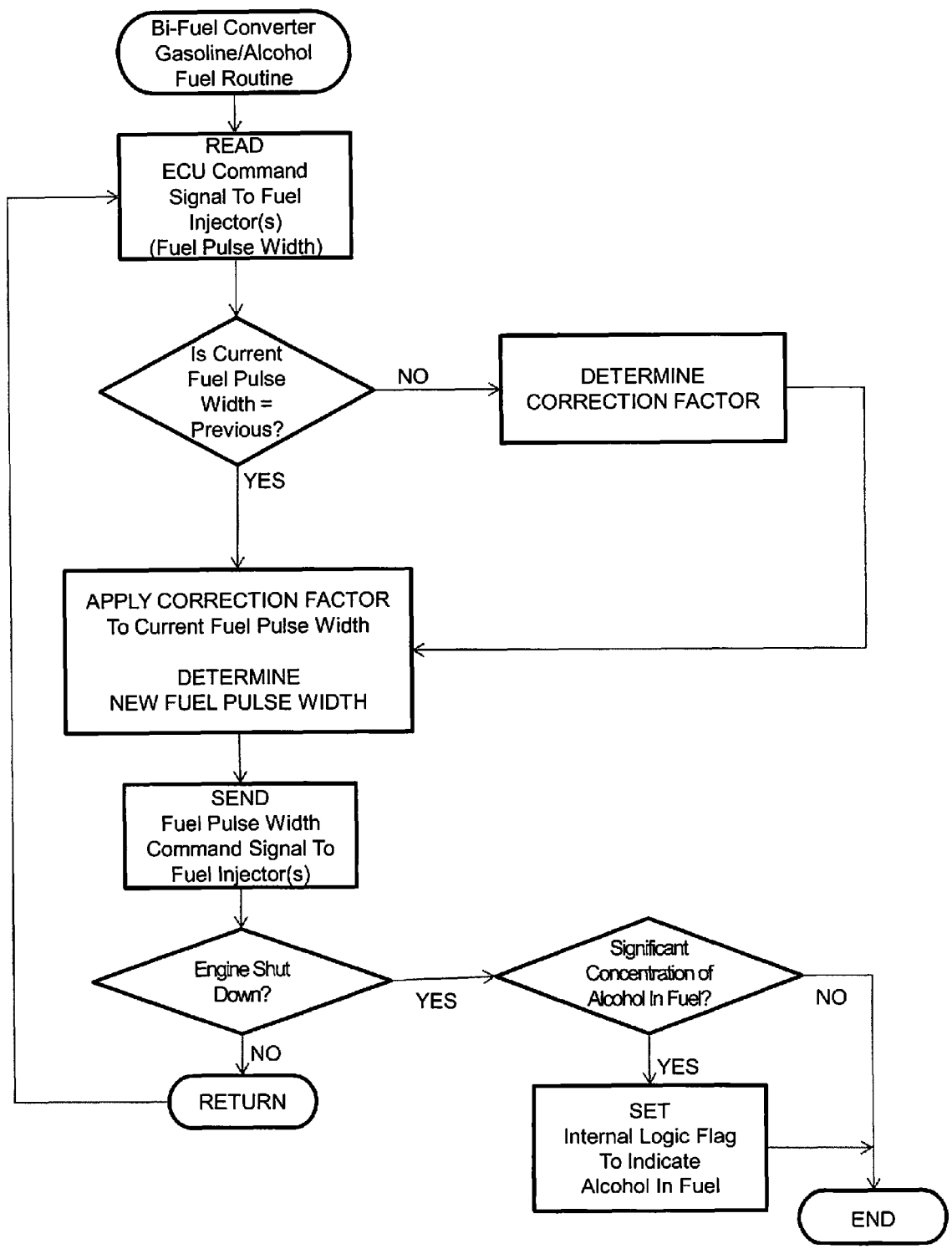
Figure 4:
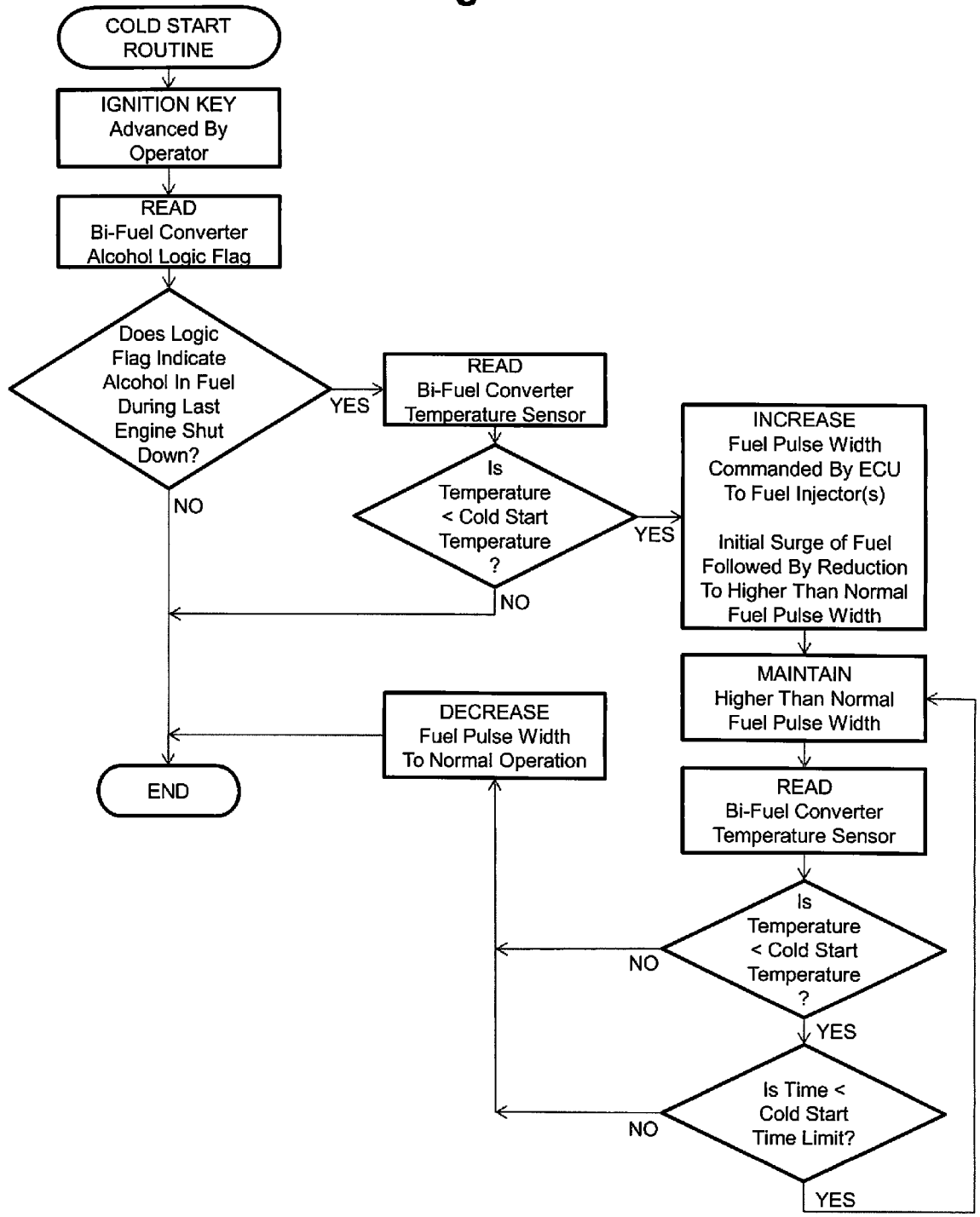
Figure 5:
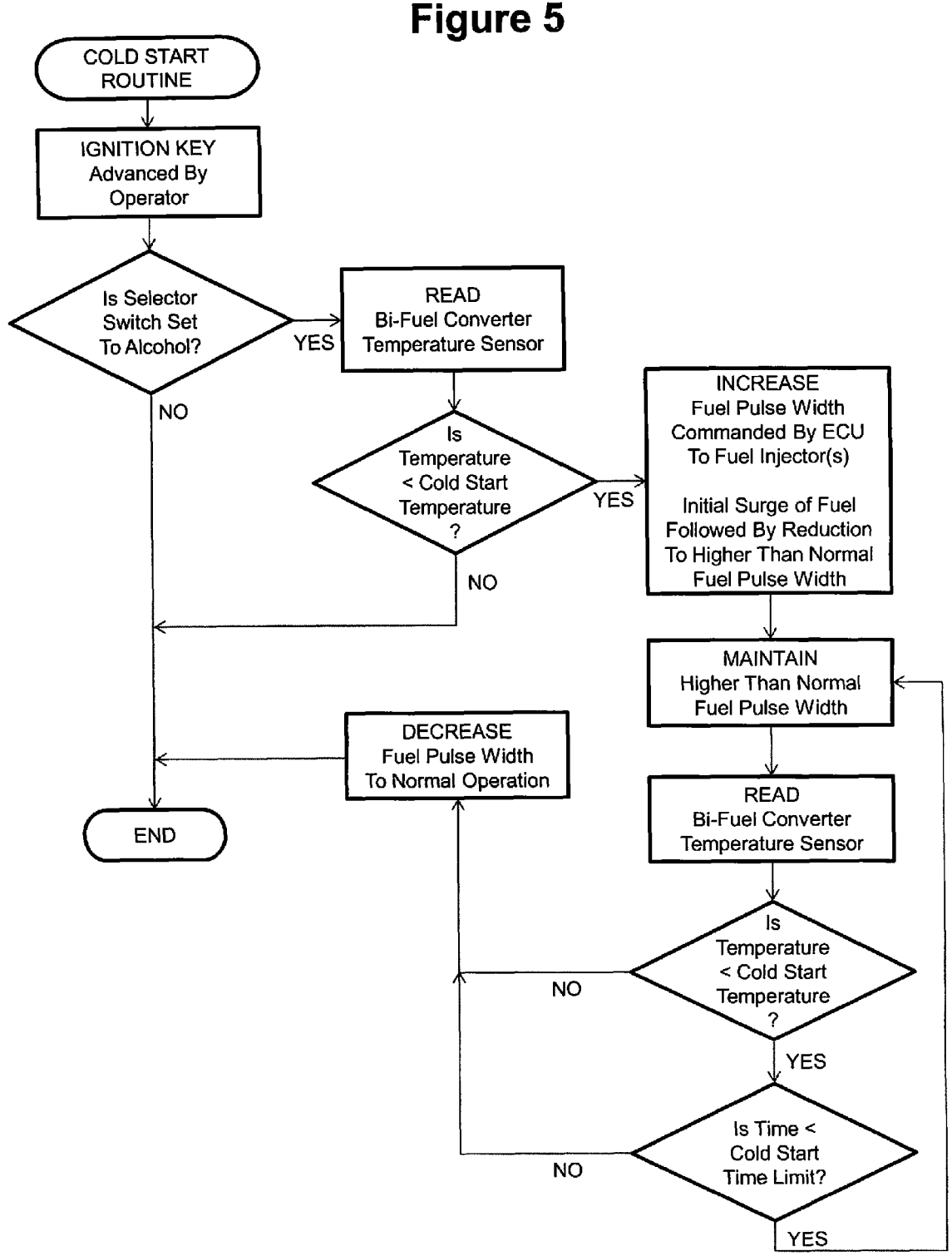
Figure 6:
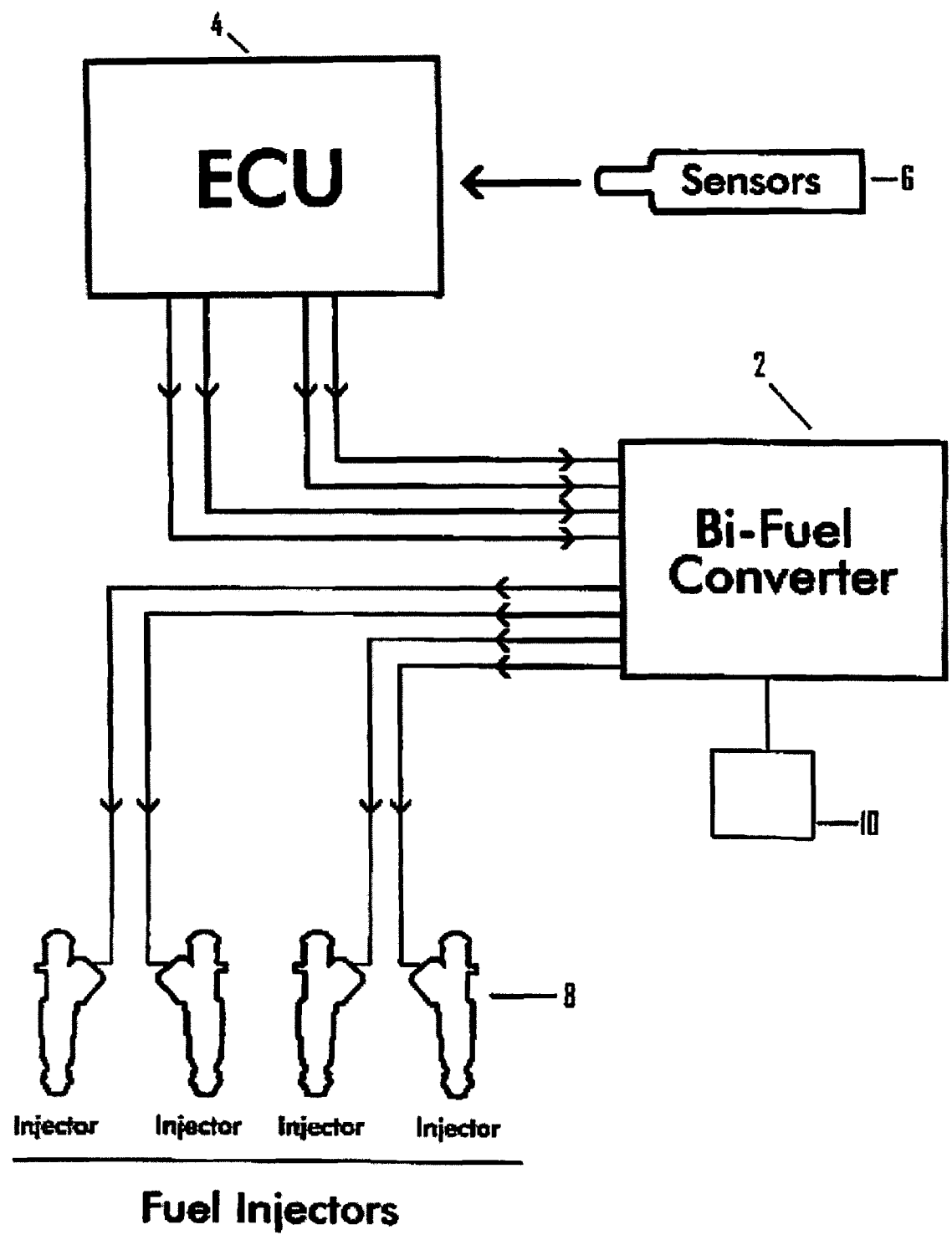

FIG. 3 further depicts the present system in a block flow diagram wherein there is depicted the detection of the type of fuel used dependent upon the interpretation of the signals from the ECU and the setting of an internal logic flag to indicate the presence of an alcohol fuel;

FIG. 4 is a block flow diagram illustrating a cold start routine of the present system wherein the presence of alcohol is detected using ECU signals, the cold start routine includes increasing the fuel pulse width when a cold temperature is detected until a normal temperature range is detected;

FIG. 5 is a further block flow diagram depicting a cold start routine with the switch embodiment determining if alcohol is the fuel source for the cold start routine; and FIG. 6 is a diagram showing the device placed between and intercepting the signals from the ECU and modifying such to the fuel injectors.

DETAILED DESCRIPTION

Disclosed is a system including a fuel conversion device for use with a conventional internal combustion engine having an engine control unit and electronic fuel injectors which allows a conventional engine to operate using more than one type of fuel. Usually, the types of alternative fuels used include gasoline and alcohol, and combinations of the two. The system intercepts the ECU's command signals transmitted to the injectors before they reach the injectors and modifies the signals for optimizing the combustion cycle depending upon the type of fuel used. The conversion device enables a conventional gasoline engine to run on an alternative fuel such as alcohol or alcohol/gasoline blends without modification to the engine.

Turning now to the FIGS. 1-6, the present apparatus is shown in various embodiments. The present system for a bi-fuel conversion device is detailed below.

Figure 1:
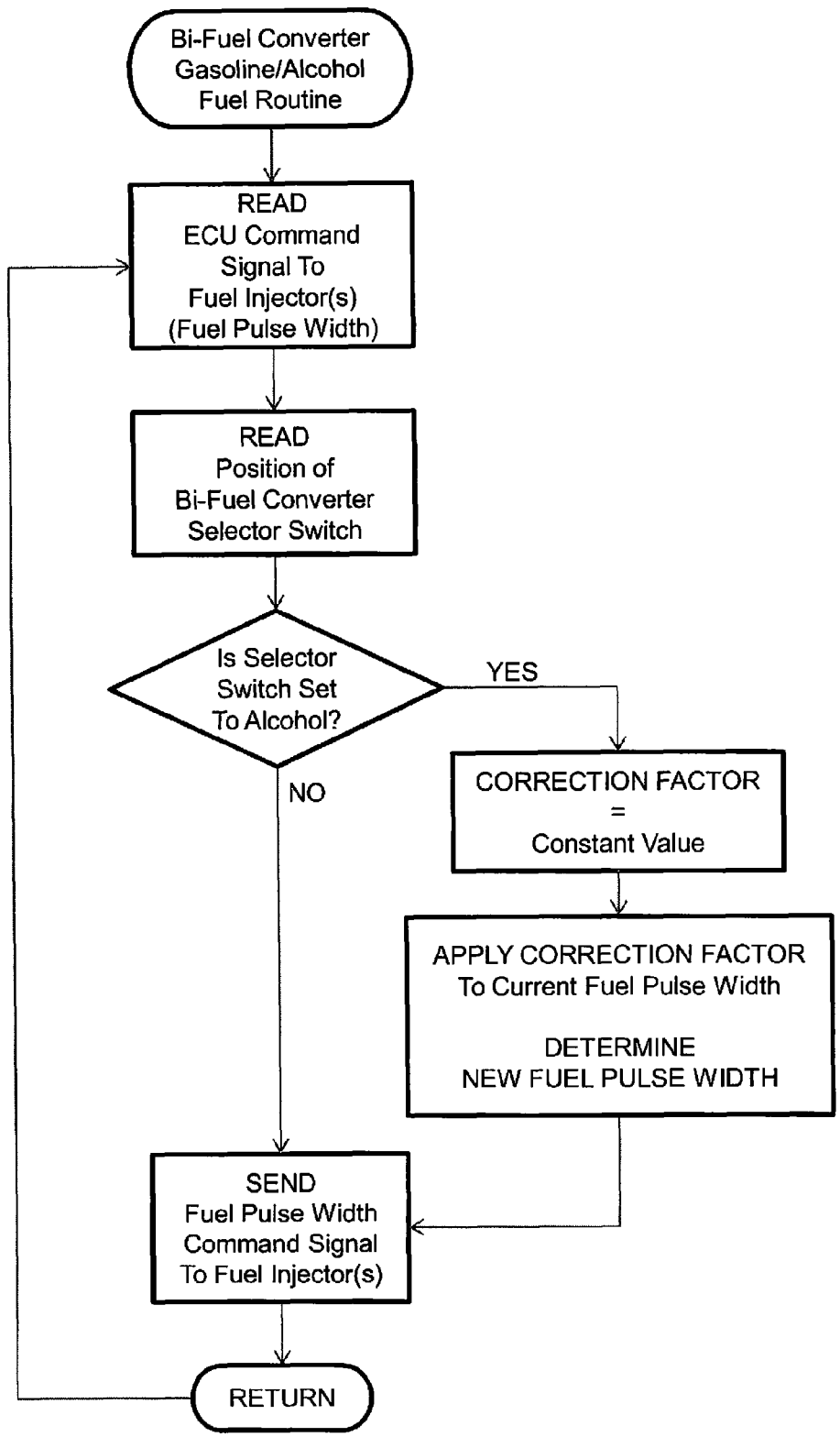
FIG. 1 is a block flow diagram of the present system wherein the correction factor is a constant value and further illustrated is a switch embodiment indicating the type of fuel.
Figure 2:
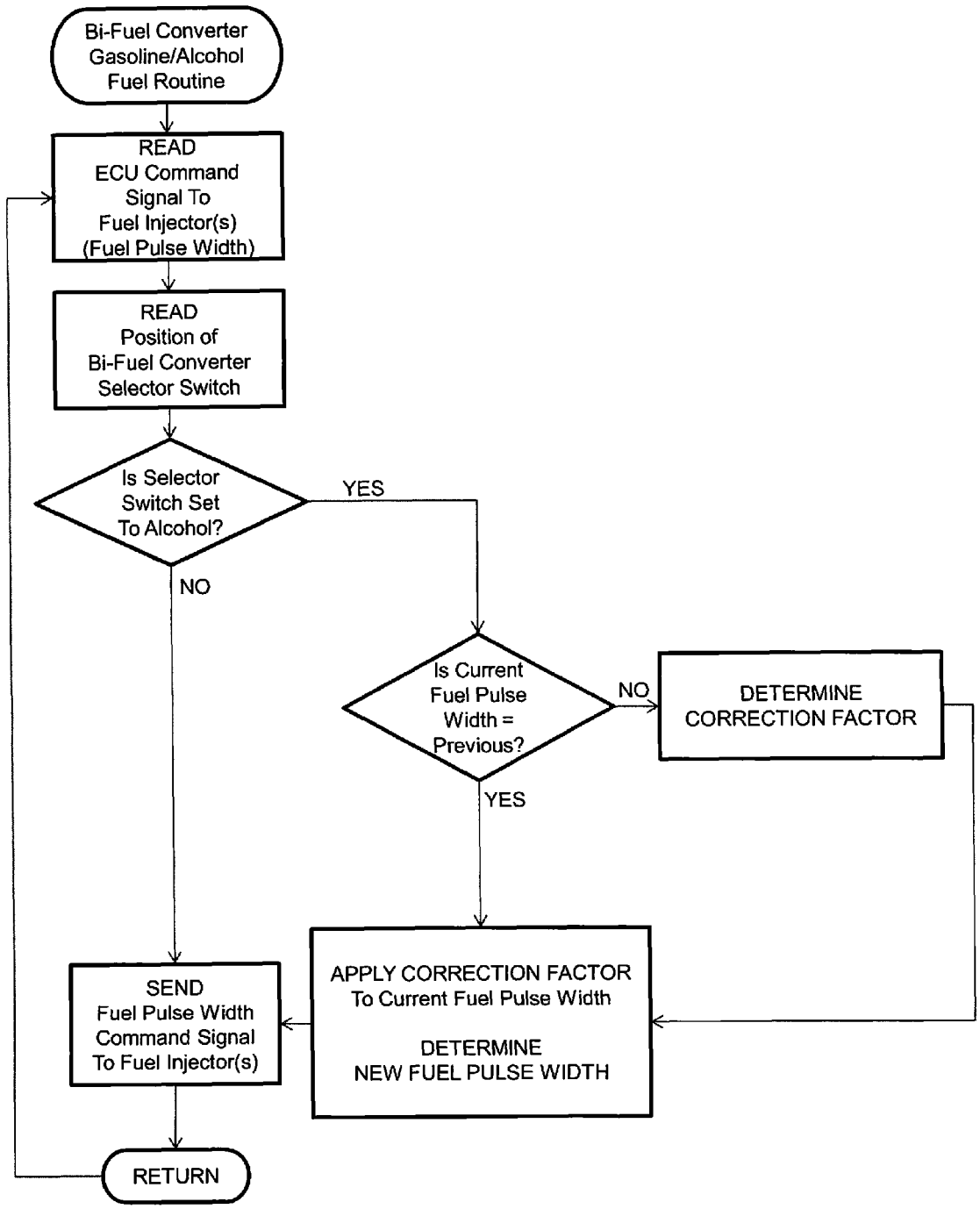
FIG. 2 is an additional block flow diagram depicting the correction factor being calculated based upon previous correction factors and changes based upon certain pulse widths.

FIGS. 1-3 present various embodiments of the current system. FIG. 1 discloses a switch embodiment wherein a selector switch is used to indicate what type of fuel is being used for the engine. For example, if a conventional gasoline engine operates using alcohol or an alcohol blend, a user would move the switch 10 to the alcohol operation position of the switch as shown in FIG. 6. The switch 10 may take any form or function and is not limited to any specific embodiment. For example the switch 10 may be located on the device 2 or located at a position separate from the device 2. The switch 10 may be a button that is pressed or other mechanism for showing a preference.

As shown in FIG. 3, the device 2 of FIG. 6 or also referred herein as the bi-fuel conversion device, may acquire a signal from the ECU to determine if the engine is operating using gasoline, alcohol or gasoline/alcohol blends. If significant alcohol is present in the fuel, the device corrects the fuel pulse width using a correction factor.

In the embodiment shown in FIG. 1, the correction factor used to correct ECU fuel pulse width signals is a constant value which is applied to algebraically adjust the magnitude of the fuel pulse width signal resulting in a modified fuel pulse width. After the fuel pulse width is modified by the device 2, the fuel pulse width signal is sent to the electronic fuel injector(s) 8 of the engine (See FIG. 6). This is accomplished by the device inside the normal ECU closed loop process wherein the continually modified signals assist the system to achieve optimized combustion. The constant value used as the correction factor in FIG. 1 is dependent upon the type of fuel used. For example, the constant value used as the correction factor for 100% ethanol is about 0.3. The correction factor for gasoline is 0.0. Thus, for mixtures of ethanol and gasoline the value of the constant can be determined by taking the product of the percent ethanol in the blend and correction factor for 100% ethanol. For example a 40% ethanol, 60% gasoline blend would have a value of 0.12. The correction factor constant may also be adjusted to accommodate other factors including various engine types utilized, environmental influences such as climate, or other considerations.

FIG. 2 discloses an embodiment of the present system wherein the correction factor changes during the operation of the engine. The correction factor is determined based upon the fuel pulse width and whether that pulse width is not equal to the last recorded fuel pulse width. If both pulse widths are the same the correction factor remains the same.

In greater detail, equations for adjusting the fuel pulse width can be represented with, but not limited by the following:

$$CF = p(CF) + [X \cdot [(c(FPW) - p(FPW))/p(FPW)]]$$

and $$\text{Adjusted}(FPW) = c(FPW) + [CF \cdot c(FPW)]$$

Alternatively, the following equations may also be used if the correction factor is not a fraction.

$$CF = pCF + X \cdot [(c(FPW) - p(FPW))]$$

and $$\text{Adjusted}(FPW) = (c(FPW) + CF)$$

In these equations the current fuel pulse is not equal to the previously recorded fuel pulse. In the equation "CF" stands for the correction factor. The notation "p(CF)" represents the previous correction factor. The notation "c(FPW)" connotes the current fuel pulse width, the notation "p(FPW)" connotes the previous fuel pulse width and the notation Adjusted (FPW)= represents the fuel pulse width as adjusted by the bi-fuel conversion device. The variable "X" is a constant used to change the correction factor in the closed loop process to make adjustments for the various types of engines used, environmental influences such as climate, or other considerations. A typical number for the "X" variable may be 0.2 by way of example and not limitation. The very first CF in the operation of the vehicle in an embodiment is 0.0. The terms "modified" and "adjusted" are used interchangeably and are defined such herein.

FIG. 3 illustrates an embodiment that is essentially the same as in FIG. 2 except that the device 2 automatically detects the presence of an alcohol fuel based upon the signals received from the ECU and an internal logic flag stored therein to indicate a significant concentration of alcohol in the fuel.

Cold Start Embodiment

In the cold start embodiment of the present system, as shown in FIGS. 4 and 5, the conversion device accomplishes cold starts based on two criteria. The conversion device first determines whether to perform the cold start process by evaluating if the level of alcohol present in the fuel is sufficiently high. If so the conversion device evaluates the temperature. In an embodiment the temperature sensor may be either built within the conversion device or apart from the conversion device. Additionally, it is contemplated that the conversion device may acquire a temperature reading from any source on the vehicle indicating an appropriate temperature reading.

If the alcohol content in the fuel is sufficiently high, and the engine temperature is below a certain value, the conversion device will initiate its cold start process to assist the ECU in starting the engine. Typically, the temperature value is less than approximately 30° C. In greater detail the cold start routine may include a full application of the cold start process at 15° C. or below and a proportional application of the cold start process between approximately 15° C. to approximately 30° C. It is appreciated that these temperature ranges are not limiting and may be varied to accommodate various factors such as different engine types, additional environmental factors, or other considerations.

Evaluation of the alcohol content for cold starts is accomplished by the conversion device in either a manual mode embodiment, typically a switch, or an automatic mode embodiment, depending on the settings used in its original programming. The manual mode embodiment of the conversion device utilizes a simple alcohol/gasoline switch. At the time of engine start, if the conversion device's engine temperature sensor indicates a temperature below a preset threshold, and the switch is set to the alcohol position, the conversion device will initiate its cold start process or routine to assist the ECU in starting the engine.

The automatic mode of the conversion device utilizes a logic flag set in its internal memory, to indicate whether a sufficient level of alcohol was present in the fuel at the time of previous engine shutdown, to warrant consideration for the cold start process at engine start. This evaluation of alcohol content is accomplished strictly by interpreting the fuel injector command signals flowing from the ECU. At the time of engine start, the cold start process is initiated if the conversion device's temperature sensor reads below a predetermined limit and the logic flag indicates that sufficient alcohol was present in the fuel during the last shutdown.

In greater detail, in the automatic mode embodiment of the conversion device 2, the logic flag is set to indicate significant alcohol in the fuel for consideration of the cold start process based on a comparison of correction factors. Specifically, the device 2 compares the last correction factor at engine shutdown to the threshold correction factor that represents the maximum alcohol content, i.e. alcohol threshold, for successful operation without assistance from the device 2. This alcohol threshold varies based on factors such as type of alcohol (methanol, ethanol, butanol etc.), make and model of engine (some manufacturer's models are more sensitive to alcohol and may require lower thresholds), climate considerations (colder climates generally require lower thresholds), quality of fuel (poorer quality fuels, i.e. those with greater contaminants such as water, require lower thresholds), and others. The threshold correction factor is the product of the alcohol threshold and correction factor for 100% alcohol. For example, an alcohol threshold for an engine running on ethanol may be in the order of 40%. The corresponding correction factor for E100 (100% ethanol) is about 0.3. The threshold correction factor is the product of 40% and 0.3=0.12. In this example, at engine shutdown the device 2 will set the logic flag to indicate significant alcohol in the fuel if the last correction factor is greater than 0.12. Thus at the time of next engine start, the cold start process will be activated if the temperature is within the cold start range.

Once the cold start process is initiated, the conversion device accomplishes it in two steps. The first step is performed during the first crank of the starter, in which the conversion device commands the fuel injector(s) to remain open several hundred percent longer than normal, to provide an initial high level of fuel flow.

The second step begins at the start of combustion, at which time the conversion device commands the injector(s) to extend their open time intervals by approximately 15% longer than normal, thereby maintaining an increased fuel flow during the warm up period. This period of increased fuel is maintained until either a pre-determined time limit has expired, or until the conversion device's engine temperature sensor indicates above a pre-determined value, whichever comes first. When either of these conditions is met, the cold start process is complete and the conversion device resumes its normal operation.

FIG. 6 depicts the device 2 placed between and intercepting the signals from the ECU 4 and modifying such to the fuel injectors 10. Additionally shown in FIG. 6 is a temperature sensor 10 operatively connected to the device 2. The computing device 2 can be any known device capable of performing the computations set forth in the present system.

While specific embodiments have been described in detail in the foregoing detailed description and illustrated in the accompanying drawings, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of any claims that are derivable from the description herein, and any and all equivalents thereof.

What is claimed is:

1. A fuel converter for use with a conventional internal combustion engine having an engine control unit and electronic fuel injectors, the converter comprising:
   a computing device operatively connected to the engine control unit to receive signals from the engine control unit and the computing device operatively connected to the electronic fuel injector for transmitting a signal to the electronic fuel injector;
   a temperature sensor in communication with the computing device;
   the computing device acquiring a signal from the engine control unit comprising a current fuel pulse width signal and the device adding the current fuel pulse width to a correction factor with a resulting sum being a modified fuel pulse width;
   the computing device transmitting the modified fuel pulse width signal to the electronic fuel injector;
   further including the correction factor multiplied by the current fuel pulse width and the resulting sum added to the current fuel pulse width if the correction factor is greater than 0 and less than 1; and
   further including the computing device comparing the current fuel pulse with a previous fuel pulse and determining a new correction factor by adding a previous correction factor to the difference between the current fuel pulse and a percent difference between the current fuel pulse and the previous fuel pulse to arrive at the new correction factor if the current fuel pulse is not equal to the previous fuel pulse.

2. The fuel converter of claim 1, further including a tuning constant comprising a fraction between 0 and 1 and multiplied by the difference between the current pulse width and the percent difference between the current fuel pulse and the previous fuel pulse.

3. A fuel converter for use with a conventional internal combustion engine having an engine control unit and electronic fuel injectors, the converter comprising:
   a computing device operatively connected to the engine control unit to receive signals from the engine control unit and the computing device operatively connected to the electronic fuel injector for transmitting a signal to the electronic fuel injector;
   a temperature sensor in communication with the computing device;
   the computing device acquiring a signal from the engine control unit comprising a current fuel pulse width signal and the device adding the current fuel pulse width to a correction factor with a resulting sum being a modified fuel pulse width;
   the computing device transmitting the modified fuel pulse width signal to the electronic fuel injector; and
   further including the computing device comparing the current fuel pulse with a previous fuel pulse and determining a new correction factor by adding a previous correction factor to the difference between the current fuel pulse and the previous fuel pulse to arrive at the new correction factor if the current fuel pulse is not equal to the previous fuel pulse.

4. The fuel converter of claim 3, further including a tuning constant comprising a fraction between 0 and 1 and multiplied by the difference between the current fuel pulse and the previous fuel pulse.

5. A fuel converter for use with a conventional internal combustion engine having an engine control unit and electronic fuel injectors, the converter comprising:
   a computing device operatively connected to the engine control unit to receive signals from the engine control unit and the computing device operatively connected to the electronic fuel injector for transmitting a signal to the electronic fuel injector;
   a temperature sensor in communication with the computing device;
   the computing device acquiring a signal from the engine control unit comprising a current fuel pulse width signal and the device adding the current fuel pulse width to a correction factor with a resulting sum being a modified fuel pulse width;
   the computing device transmitting the modified fuel pulse width signal to the electronic fuel injector;
   further including the computing device determining if a fuel source predominately comprises alcohol prior to adding the fuel pulse width; and
   wherein the fuel source type is determined by interpreting the fuel injector command signals from the engine control unit by a previously stored determined conversion factor stored within the computing device as an internal logic flag to indicate alcohol in the fuel when the determined conversion factor exceeds a threshold number.

6. A method of operating a conventional internal combustion engine having an engine control unit and electronic fuel injectors to run on an alternative fuel based in at least part alcohol comprising the steps of:
   acquiring a signal from the engine control unit comprising a current fuel pulse width signal;
   adding the current fuel pulse width to a correction factor with a resulting sum being a modified fuel pulse width; and
   transmitting the multiplied fuel pulse width signal to the electronic fuel injector;
   further including multiplying the current fuel pulse width by the correction factor with a resulting product added to the current fuel pulse width if the correction factor is greater than 0 and less than 1; and
   further including comparing the current fuel pulse with a previous fuel pulse and determining a new correction factor by adding a previous correction factor to the difference between the current fuel pulse and a percent difference between the current fuel pulse and the previous fuel pulse to arrive at the new correction factor if the current fuel pulse is not equal to the previous fuel pulse.

7. The method of claim 6, further including multiplying a tuning constant comprising a fraction between 0 and 1 and multiplied by the difference between current fuel pulse width and the percent difference between the current fuel pulse and the previous fuel pulse.

8. A fuel converter for use with a conventional internal combustion engine having an engine control unit and electronic fuel injectors, the converter comprising:
   a computing device operatively connected to the engine control unit to receive signals from the engine control unit and the computing device operatively connected to the electronic fuel injector for transmitting a signal to the electronic fuel injector;
   a temperature sensor in communication with the computing device;
   the computing device acquiring a signal from the engine control unit comprising a current fuel pulse width signal and the device multiplying the fuel pulse width by a correction factor with a resulting product added to the current to produce a modified pulse width;

the computing device further determining if a fuel source composition prior to multiplying the fuel pulse width;

the computing device comparing the current fuel pulse with the previous fuel pulse and determining a correction factor by adding the percent difference between the current fuel pulse and the previous fuel pulse to the previous correction factor to arrive at the correction factor if the current fuel pulse is not equal to the previous fuel pulse; and the computing device transmitting the multiplied fuel pulse width signal to the electronic fuel injector.

9. The fuel converter of claim 8, further including the computing device reading a temperature signal from the temperature sensor and determining if a cold start routine is needed, whereby the cold start routine includes increasing the amount of fuel injected when an alcohol fuel is detected.

* * * * *